(12) United States Patent
Wiseman et al.

(10) Patent No.: US 8,037,520 B2
(45) Date of Patent: Oct. 11, 2011

(54) COMMUNICATIONS SYSTEMS FIREWALL

(75) Inventors: Simon Robert Wiseman, Worcestershire (GB); Christopher James Cant, Worcestershire (GB)

(73) Assignee: Qinetiq Limited (GB)

( * ) Notice: Subject to any disclaimer, the term of this patent is extended or adjusted under 35 U.S.C. 154(b) by 731 days.

(21) Appl. No.: 12/066,419

(22) PCT Filed: Sep. 12, 2006

(86) PCT No.: PCT/GB2006/003388
§ 371 (c)(1),
(2), (4) Date: Mar. 11, 2008

(87) PCT Pub. No.: WO2007/031744
PCT Pub. Date: Mar. 22, 2007

(65) Prior Publication Data
US 2008/0209542 A1 Aug. 28, 2008

(30) Foreign Application Priority Data

Sep. 13, 2005 (GB) .................................. 0518578.0

(51) Int. Cl.
*G06F 21/00* (2006.01)
(52) U.S. Cl. .................. 726/14; 726/1; 726/11; 726/12; 726/13; 726/22; 726/23; 726/24; 726/25; 709/230; 709/238; 709/246
(58) Field of Classification Search .................... 726/11, 726/13, 14, 23, 24, 25, 1, 12, 22; 709/230, 709/238, 246
See application file for complete search history.

(56) References Cited

U.S. PATENT DOCUMENTS

| 6,032,259 | A | 2/2000 | Nemoto | |
|---|---|---|---|---|
| 6,202,081 | B1 | 3/2001 | Naudus | |
| 6,772,345 | B1 * | 8/2004 | Shetty | 726/24 |
| 7,624,142 | B2 * | 11/2009 | Jungck | 709/201 |
| 2003/0110396 | A1 | 6/2003 | Lewis et al. | |
| 2003/0212900 | A1 * | 11/2003 | Liu et al. | 713/200 |
| 2004/0161086 | A1 | 8/2004 | Buntin et al. | |
| 2004/0172557 | A1 * | 9/2004 | Nakae et al. | 713/201 |

(Continued)

FOREIGN PATENT DOCUMENTS

WO  WO 02/23805  3/2002

OTHER PUBLICATIONS

Daniel Bradley et al, Linking Chains A methodology for developing rules for IP chains, pp. 1-20, The proceedings of the annual conference of the Australian Unix Users Group, 2002.*
N. Dadoun, Security Framework for IP Telephony White paper, pp. 1-21, Polycom, 2002.*

(Continued)

*Primary Examiner* — Nasser Moazzami
*Assistant Examiner* — Shanto M Abedin
(74) *Attorney, Agent, or Firm* — McDonnell Boehnen Hulbert & Berghoff LLP

(57) ABSTRACT

Methods, apparatus, programs and signals for providing communications network security. The approach is based on using established "standard" protocols, but packets (or cells or frames) are deliberately malformed by the sender, optionally according to a predetermined rule (for example by inverting a packet check digit). A filter forwards only packets identified as being invalid, optionally in accordance with the rule; packets which are valid with respect to the "standard" protocol are dropped. The filter is preferably implemented in hardware to mitigate the risk of its being compromised by a malicious attack.

10 Claims, 3 Drawing Sheets

U.S. PATENT DOCUMENTS

| | | | | |
|---|---|---|---|---|
| 2004/0268147 | A1* | 12/2004 | Wiederin et al. | 713/201 |
| 2005/0213570 | A1* | 9/2005 | Stacy et al. | 370/389 |
| 2005/0251859 | A1* | 11/2005 | Quittek et al. | 726/22 |
| 2006/0080733 | A1* | 4/2006 | Khosmood et al. | 726/13 |
| 2006/0123481 | A1* | 6/2006 | Bhatnagar et al. | 726/24 |
| 2006/0191008 | A1* | 8/2006 | Fernando et al. | 726/23 |
| 2007/0076690 | A1* | 4/2007 | Dyck et al. | 370/352 |
| 2007/0209067 | A1* | 9/2007 | Fogel | 726/11 |
| 2007/0234414 | A1* | 10/2007 | Liu | 726/11 |
| 2007/0245415 | A1* | 10/2007 | Wiseman | 726/14 |

OTHER PUBLICATIONS

Epstein, "Architecture and Concepts of the ARGuE Guard", Computer Security Applications Conference, 1999. Proceedings. 15th Annual Phoenix, AZ. IEEE, pp. 45-54, (Dec. 6, 1999).

Tiny Software: "WinRoute Pro 4.1 for Windows 98/NT/2000", Retrieved from Internet: URL:http://www.icsalabs.com/html/communities/firewalls/certification/vendors/tinysoftware/winroute/nt/pdf. [retrieved on Jul. 10, 2001].

* cited by examiner

COMMUNICATIONS SYSTEMS FIREWALL

FIELD OF THE INVENTION

The present invention relates to apparatus, methods, signals, and programs for a computer for providing communications system firewalls and systems incorporating the same.

BACKGROUND TO THE INVENTION

A critical computer network that receives data from outside is vulnerable to attacks that place code in the data. For this reason, such networks are usually protected by firewall processors which check the data to ensure that it contains no code.

Many products are available to provide this kind of protection, including Firewall-1 from CheckPoint Software Technologies Limited.

However, a sophisticated attacker might use malformed data to take control of the firewall itself. Such attacks work because software that mishandles malformed data often fails in such a way as to execute some portion of the data. The attacker can contrive to cause the software to fail and execute data of their choosing, thus giving them control of the firewall. Once the attacker has control of the firewall they are generally free to access the resources of the critical network in arbitrary ways.

Referring to FIG. 1, communications protocols are built up in layers 1, with the services offered by one layer being used to implement a richer protocol at the next layer. Firewalls 2 operate by intercepting the lower layer communications between two networks and performing some checks on that communication. The number of layers that are intercepted can be varied, providing a trade off between strength and performance.

Firewalls that intercept only the very lowest protocol layer are faster because minimal protocol handling is required. However they have limited strength because attacks or errors occurring above the intercepted layers pass unseen. In contrast, firewalls that intercept all the layers of protocol are slower because they must perform more protocol handling, but are stronger because they can check all information in the communications.

It is well known how to construct firewalls using software and a general purpose computer with two network interface cards. The book "Building Internet Firewalls" by Zwicky et. al. and published by O'Reilly provides a standard reference and Cisco Systems of San Jose, Calif. offer a variety of products.

The security weakness with such application level firewalls is that any flaws, or configuration mistakes, in the network stack may lead to the checks being bypassed.

Referring now to FIG. 2, the weakness of the network stack was noted by Nemoto who disclosed a solution (U.S. Pat. No. 6,032,259) that avoided failures in the protocol stack resulting in the checks being bypassed.

In Nemoto's solution an external computer 3 (referred to in that patent as "outside host") uses an application proxy 4 to intercept communication at the highest level and forward it to the firewall 5 ("inside host") using a simple dedicated communication mechanism rather than a network interface. In this way errors in the complex protocol stack software of the firewall do not lead to the checks being bypassed.

Nemoto's solution relies on the simplicity that can be achieved by using a dedicated communication mechanism. However, Nemoto's solution excludes the use of fast network interfaces, because these allow shared use and require complex software to control them.

If Nemoto's solution were used with a complex communication mechanism, the software required in the firewall would be complex. Any errors in this software would leave the firewall open to attack from the external computer, which is itself open to attack from other computers on the external network.

Hence Nemoto's solution is limited in terms of the performance it can deliver and this cannot be improved without affecting confidence in the security of the solution.

Referring now to FIG. 3, a potential solution to improve a firewall's vulnerability to implementation flaws in the protocol stack is to implement the firewall's function in hardware. Possible techniques are described in Cheng's master's dissertation for the University of Saskatchewan entitled "Silicon Firewall Prototype" and the paper "Specialized Hardware for Deep Network Packet Filtering" by Cho et. al. of the University of California in Los Angeles.

These hardware solutions reproduce the protocol handling 6 and checking 7 functionality of a firewall 8 using logic gates rather than software. Logic gates cannot, under operational conditions, be rearranged while software can be modified "on-the-fly". As a result, the attacker is denied the possibility of gaining control over the firewall's protocol stack.

However, the complexity of standard Internet protocols is such that the techniques are only practical for lower layer protocols, such as TCP/IP, rather than application level protocols such as SMTP.

The fact that these hardware firewalls can, in practice, only apply checks to lower level protocols means they are easily defeated if mistakes occur in the higher level protocols.

Referring now to FIG. 4, an alternative arrangement of hardware logic which works at the application protocol level is described in co-pending international patent application GB05/001844. This describes how a simple hardware device 9 can apply a simple digital signature check 10 to application data passing from one network to another.

This solution avoids relying on the correct operation of any complex network stack by running the check directly in the hardware device that is handling the low level communications. Complex application specific checks are accommodated by performing them on separate computers within the protected network and then applying a digital signature to the data to signify that it has been checked. It is this digital signature that is validated by the hardware device.

Such a solution is not, however, applicable for data sent into a protected network from a potentially hostile network. This is because the application-specific checkers would be hosted on the hostile network and so are prone to attack, allowing an attacker to have a digital signature applied to data that should not be allowed to enter the protected system.

SUMMARY OF THE INVENTION

The invention seeks to provide an improved method, apparatus, and programs for computers for constructing a firewall in a way that reduces its vulnerability to attack, preferably without reducing performance.

According to a first aspect of the present invention there is provided a method of providing communications network security, the method comprising the steps of: receiving a series of one or more protocol transmission units; forwarding only protocol transmission units which are invalid with respect to the definition of the protocol.

In some embodiments the one or more protocol transmission units are invalid in accordance with a predetermined rule.

The method may further comprise the step of: sending the series of one or more a protocol transmission units, the transmission units being malformed according to the predetermined rule.

The method may further comprise the step of: receiving forwarded protocol transmission units and passing all invalid protocol transmission units to a data receiver configured to treat the protocol transmission units as being valid.

The protocol transmission unit may be one of a packet, a cell, and a frame.

The protocol may be a network layer protocol.

The protocol may be a version of the internet protocol.

The invention also provides for a system for the purposes of communications which comprises one or more instances of apparatus embodying the present invention.

In particular, according to a further aspect of the present invention there is provided a communications system comprising: a filter arranged to receive a series of one or more protocol transmission units and to forward only those protocol transmission units which are invalid with respect to the definition of the protocol.

Preferably the one or more protocol transmission units are invalid in accordance with a predetermined rule.

Preferably the filter is implemented in one of hardware and firmware.

The system may also comprise: a sender arranged to send to the filter, the series of one or more a protocol transmission units, transmission units intended for onward forwarding being deliberately malformed with respect to the definition of the protocol.

The invention also provides for computer software in a machine-readable form and arranged, in operation, to carry out every function of the apparatus and/or methods.

In particular, according to a further aspect of the present invention there is provided a program for a computer, the program comprising code portions arranged to: receive a series of one or more protocol transmission units; forward only protocol transmission units which are invalid with respect to the definition of the protocol.

The program may also comprise further code portions arranged to: send the series of one or more a protocol transmission units, the transmission units being deliberately malformed with respect to an established definition of the protocol.

The invention is also directed to signals employed by the other aspects of the invention.

In particular, according to a further aspect of the present invention there is provided a signal for transmission over a communications network, the signal comprising: a series of one or more protocol transmission units, the series comprising predominantly protocol transmission units which are invalid with respect to the definition of the protocol.

In preferred embodiments the protocol transmission units are invalid according to a predetermined rule for malforming the protocol transmission units.

According to a further aspect of the present invention there is provided a compound signal for transmission over a communications network, the signal comprising: an input signal comprising a series of one or more protocol transmission units, the series comprising predominantly protocol transmission units which are invalid with respect to the definition of the protocol; an output signal comprising a series of protocol transmission units, the series consisting of those protocol transmission units in the first input signal which are invalid.

In preferred embodiments the protocol transmission units are invalid according to a predetermined rule for malforming the protocol transmission units.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

To support fast communication with a firewall, the present invention utilises standard networking media. To ensure that the firewall is not prone to attack by exploiting flaws in the implementation of a complex protocol stack, this invention uses hardware logic to ensure that communication with the firewall is via a simple protocol that is handled by simple communications software, rather than a complex protocol stack.

Figure 1:
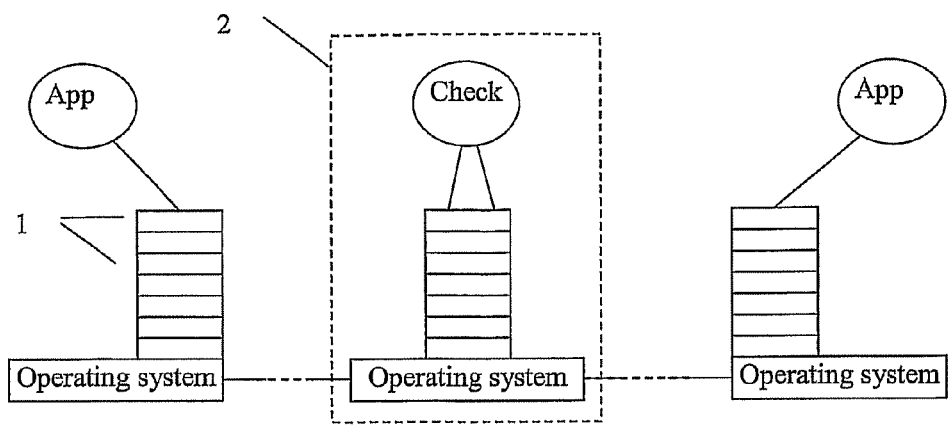
FIG. 1 shows a schematic diagram of a first prior art system.
Figure 2:
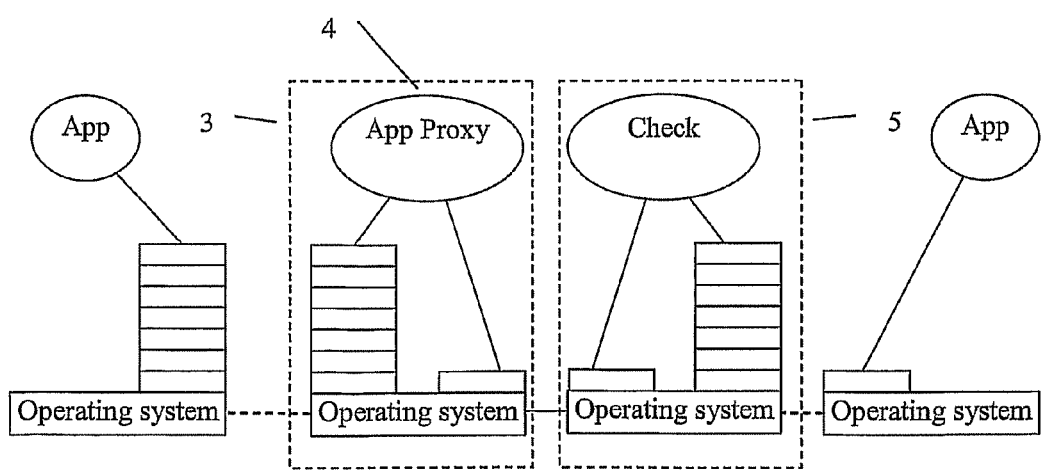
FIG. 2 shows a schematic diagram of a second prior art system.
Figure 3:
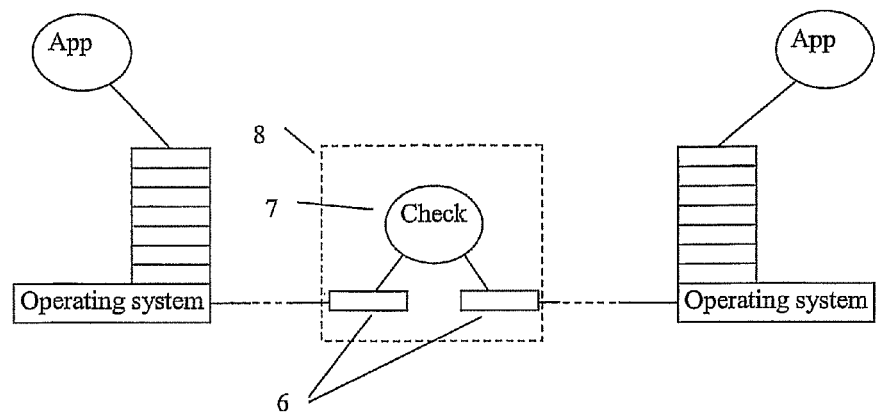
FIG. 3 shows a schematic diagram of a third prior art system.
Figure 4:
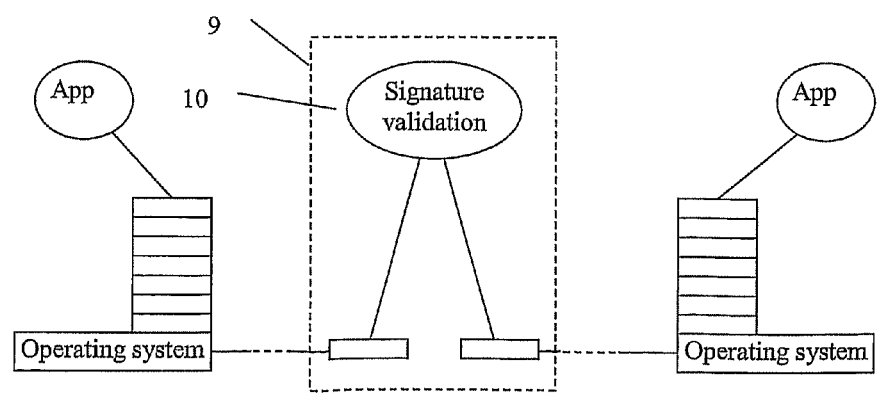
FIG. 4 shows a schematic diagram of a fourth prior art system.
Figure 5:
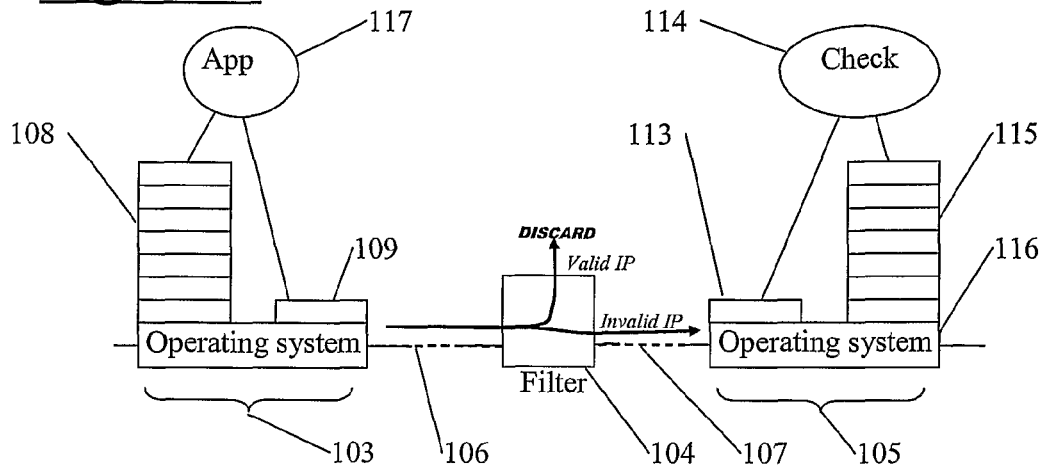
FIG. 5 shows a schematic diagram of a first system in accordance with the present invention.

Referring to FIG. 5, unlike in Nemoto's scheme, here the communication with the firewall is via a standard high speed network interface. One aspect of the invention is that a hardware logic device 104 ensures that any data passing across this interface will be deemed illegal if it is processed by the firewall's protocol stack.

For example, if Ethernet networking devices are used, the hardware logic device 104 would examine Ethernet packets passing between the external computer 103 and the firewall 105. The device would check whether these packets were formatted as legal Internet Protocol (IP) packets. Any packet that is a legal IP packet would be discarded. Only those that are illegal IP packets (and also meeting the specific constraints of the defined firewall protocol) would be allowed to pass. As the diagram shows, the external computer may have a complex network protocol software stack interfacing to the internal network, but this is not used.

By using fibre optic networking hardware to connect just one external computer to the firewall, via the hardware logic device, data transmission is fast and extremely reliable. The protocol need not therefore include complex functions for controlling shared access and error recovery.

The firewall receives data from the external computer via the hardware logic device, but may have other network interfaces to computers on the critical computer network that it protects. These will be controlled by standard protocol stack software, which is prone to attack through handling malformed data. While the data received from the external system should be handled by the software concerned with the special simple protocol, errors could lead to data being handled by the standard protocol stack software. This would allow the attacker to exploit any flaws in that software.

However, the hardware logic device ensures that no protocol data deemed legal by the standard protocol stack software ever reaches the firewall. Thus even if an external attacker were able to send data to the standard protocol stack, it would be immediately discarded.

The fact that the check implemented by the device is simple and the device has no state means that implementation errors are unlikely and it can be tested exhaustively, providing high confidence that no valid IP packets will pass through. The fact that the device is implemented in hardware logic means that an attacker cannot take control of it by finding and exploiting flaws in its protocol handling logic. The fact that the protocol is simple and straightforward means the firewall's software for handling it is straightforward to implement and it is practical to demonstrate the absence of flaws. The fact that the packets allowed to pass are invalid IP packets means that, should a software error lead to data being passed to the firewall's IP stack software it will be immediately discarded as invalid.

Thus unlike Nemoto's device, this invention is able to utilise high performance standard networking devices without undermining its security. The invention therefore provides high security with high performance.

Figure 6:
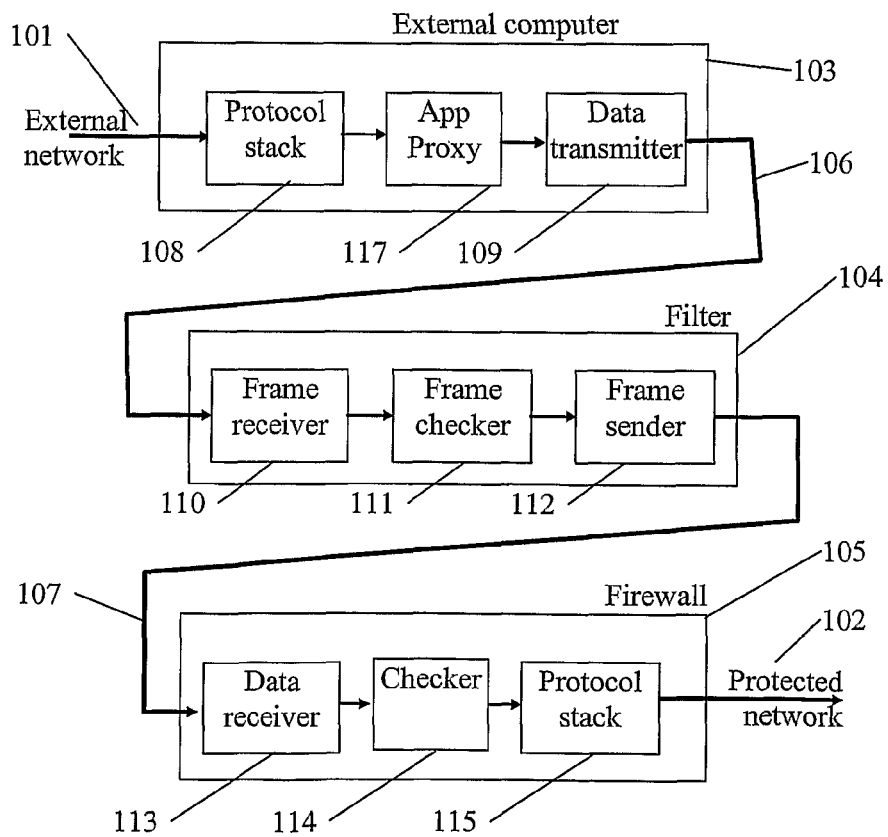
FIG. 6 shows a schematic diagram of a second system in accordance with the present invention.

Referring now to FIGS. 5 and 6, an external computer 103 is connected to an external network 101. Other computers (not shown) on the external network can communicate with the external computer using standard networking protocols. The protocols are handled by the external computer's protocol stack software 108 and the data received is passed by an application proxy 117 to the data transmitter 109. The data transmitter sends the data to the filter 104 via dedicated network 106 as a series of frames using a protocol that is illegal as far as the protocol stack 115 of the firewall 105 is concerned.

The filter's frame receiver 110 receives the frames sent by the data transmitter and passes them one at a time to the frame checker 111. The frame checker examines the frame's data and determines whether it is to be discarded or allowed to pass. If it is allowed to pass, the frame is passed to the frame sender 112, otherwise is it simply discarded. The frame sender sends the frame to the firewall 105 via dedicated network 107.

For a correctly functioning operating system 116 frames received from the dedicated network 107 are directed only to the data receiver 113. In the event that the operating system misdirects incoming frames to the protocol stack 115, the data will be discarded as being invalid.

When the firewall's data receiver 113 receives the frames sent by the data transmitter that have been passed by the frame checker, the data receiver extracts the data from the frames, and assembles it to reform the data that was originally received by the protocol stack 108 from the external network. Once the data has been assembled it is passed to the checker 114 which checks that it is fit to pass into the protected network. If the checker finds the data to be acceptable, it is passed to the firewall's protocol stack 115 which sends the data to its destination within the protected network using standard networking protocols.

In a specific embodiment, the frames may be Ethernet™ or PCI Bus frames, and different protocols may be used on opposite interfaces of the filter. Other suitable protocols will be apparent to the person skilled in the art. The data contained in those frames may be, for example, Internet Protocol packets, and it is this data which is analysed and filtered by the filter 104. Again other suitable protocol formats will be apparent to the person skilled in the art.

Although the particular embodiments described above relate to network layer protocols (packets) carried over link layer protocols (frames), the present invention may also be used at other protocol stack levels. However higher layers typically involve more complex protocol formats which would add to the relative complexity of the filter mechanism. The method is therefore preferably performed at lower protocol layers.

Bi-directional communication between the two networks may be achieved using two separate instances of the device operating in parallel.

Whilst the arrangement has been described above in respect of processing data directed to the firewall from an external network, the same approach may be used to protect the firewall from attack from within the protected network. In this case a further filter is provided between a computer internal to the protected network and the firewall to filter traffic directed from the internal network to the firewall. In this way the firewall may be protected from attack from all sources external to the firewall itself.

Communication between the external computer and firewall may be achieved in practice by using protocols designed for the purpose, rather than ones with general utility. The advantage being that the protocols are simple and so the filter device is simple and hence establishing confidence in its correct operation is straightforward.

By making the filter device a separate hardware entity this ensures that it cannot be bypassed, for example as the result of any fault in the system in which it might otherwise be embedded. Such faults could for example arise as the result of a malicious attack on such a system.

In order to render packets recognisable as invalid a number of different approaches are possible. For example, suitable rules for constructing invalid packets include, but are not limited to:

setting an address, type, or other field (including fields normally containing a fixed value) of the packet to an invalid value;

using a checksum (or check digit) algorithm which, for a given packet, gives a checksum value distinct from that associated with the conventional or standard checksum algorithm defined for that protocol.

Any range or device value given herein may be extended or altered without losing the effect sought, as will be apparent to the skilled person for an understanding of the teachings herein.

The invention claimed is:

1. A method of providing communications network security, the method comprising the steps of:
providing computerized communication systems comprising:
a filter having in input channel and an output channel;
an operating system having an input channel coupled to the output channel of the filter, and an output channel;
a receiver coupled to an upper interface to the operating system below and at a lower interface to a content checker above;
a protocol stack coupled at a lower interface to the operating system below and at an upper interface to the content checker above;
configuring the content checker to receive data from the upper interface to the receiver and to forward said data to the upper interface of the protocol stack responsive to content checks applied to said data;
configuring the receiver to forward to the content checker only data received from the operating system which is contained in network layer protocol transmission units each consisting of a protocol frame, cell, or packet which is invalid with respect to the protocol stack;

sending to the filter the series of one or more a network layer protocol transmission units, the network layer protocol transmission units being deliberately malformed according to the predetermined rule;

configuring the filter to forward to the operating system only network layer protocol transmission units which are invalid with respect to the protocol stack; and receiving at the filter a series of one or more network layer protocol transmission units;

forwarding from the filter only network layer protocol transmission units which are invalid with respect to the definition of the protocol.

2. A method according to claim 1 in which the one or more network layer protocol transmission units are invalid in accordance with a predetermined rule.

3. A method according to claim 1 further comprising the step of:

receiving forwarded network layer protocol transmission units at the receiver.

4. A method according to claim 1 in which the protocol is a version of the internet protocol.

5. A communications system comprising:

a filter comprising computer hardware and having an input channel and an output channel;

an operating system having an input channel coupled to the output channel of the filter, and an output channel;

a receiver coupled at an upper interface to the operating system below and at a lower interface to a content checker above;

a protocol stack coupled at a lower interface to the operating system below and at an upper interface to the content checker above; the content checker being configured to receive data from the upper interface of the receiver and to forward said data to the upper interface of the protocol stack responsive to content checks applied to said data; and wherein the receiver is configured to forward to the content checker only data received from the operating system which is contained in network layer protocol transmission units each consisting of a protocol frame, cell, or packet which is invalid with respect to the protocol stack; and wherein the filter is arranged to forward to the operating system only network layer protocol transmission units which are invalid with respect to the protocol stack; and a sender arranged to send to the filter, the series of one or more protocol transmission units, transmission units intended for onward forwarding being deliberately malformed with respect to the protocol stack.

6. A communications system according to claim 5 in which the filter is arranged to forward only protocol transmission units which are invalid with respect to the protocol stack and in accordance with a predetermined rule.

7. A communications system according to claim 5 in which the protocol is an internet protocol.

8. A communications system according to claim 5 in which the receiver comprises a protocol engine implemented in one of hardware and firmware.

9. A communications system according to claim 5 in which of the receiver is arranged to accept network layer protocol transmission units whose format is the same as those accepted by the network layer of the protocol stack, but whose content is invalid with respect to the network layer protocol of the protocol stack.

10. A communications system according to claim 5 in which the filter is implemented in one of hardware and firmware.

* * * * *